Jan. 21, 1969   N. J. PANSING   3,423,572
CONTROL FOR SURFACE HEATERS
Filed June 14, 1966

INVENTOR.
Nelson J. Pansing
BY Carl A Stickel
His Attorney 3,423,572
CONTROL FOR SURFACE HEATERS
Nelson J. Pansing, Clayton, Ohio, assignor to General Motors Corporation, Detroit, Mich., a corporation of Delaware
Filed June 14, 1966, Ser. No. 557,419
U.S. Cl. 219—449          5 Claims
Int. Cl. H05b 3/68

ABSTRACT OF THE DISCLOSURE

In the preferred form, a cooking range has surface heaters enclosed by a heat permeable cover above and a reflector beneath. Heat sensitive controls for the heaters are provided on the back panel. A glass rod or fiber optic extends beneath the range top from one of the surface heaters to its heat sensitive control on the back panel to provide a control responsive to the heat emitted.

---

This invention pertains to surface heaters for ranges in which the heaters are enclosed and provided with a permeable cover. To control the surface heaters without physically penetrating the cover, a ray conducting device extends from within the enclosure to a very sensitive control device remotely located on the control panel of the range.

The thermostatic control of surface heaters has come into use on the higher priced ranges. It is customary to provide a temperature responsive element in the center of the thermostatic control surface heaters. More recently it has been proposed to use infrared surface heaters with flat glass covers extending completely and continuously over the top of the heating element. Such a cover would not permit the use of a conventional thermostatic control of surface heaters unless an opening were provided in the center of the glass top.

It is an object of this invention to provide a simple, inexpensive, thermostatic control for a surface heater having an unperforated cover.

It is another object of this invention to provide a simple, inexpensive, thermostatic control for surface heaters having a remote actuating control with a simple means for conducting a function of the heat from the surface heaters to the remote actuator control.

It is another object of this invention to provide a simple, inexpensive thermostatic control for a surface heater having a simple heat ray transmitting device extending from the surface heater to a remote actuating control.

These and other objects are attained in the form shown in the drawings in which a ribbon resistance of a surface heater is enclosed between a reflector and a glass cover. Extending from the space between the reflector and cover is a ray conductor in the form of a flexible fiber optic or a glass rod which extends to and transmits heat rays to the remote ray sensitive circuit of the heater controller. This controller comprises a light sensitive resistance provided to control the current flow through a silicon controlled rectifier for controlling current flow through the resistance.

Further objects and advantages of the present invention will be apparent from the following description, reference being had to the accompanying drawings wherein preferred embodiments of the present invention are clearly shown.

Figure 1:
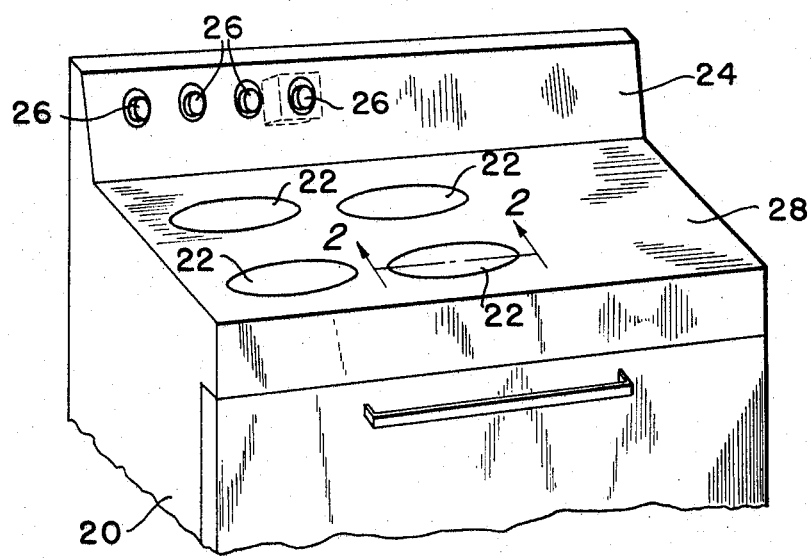
FIGURE 1 is a perspective view of an electric range embodying one form of my invention.
Figure 2:
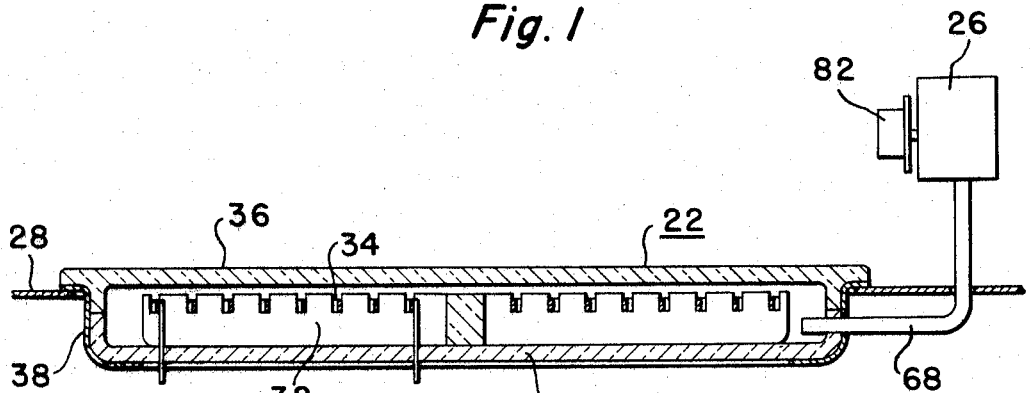
FIGURE 2 is a fragmentary vertical sectional view taken along the lines 2—2 of FIGURE 1; and, FIGURE 3 is a wiring diagram including the surface heater shown in FIGURES 1 and 2.

Referring now more particularly to FIGURE 1 there is illustrated a domestic electric range 20 provided with four surface heaters 22 all of which may be of the glass covered type illustrated in FIGURE 2. The range is provided with a back control panel 24 containing a control unit 26 for each of the surface heaters 22. The surface heaters 22 are supported within apertures in the range top 28.

Each surface heater 22 includes a bottom reflector 30 which may be made of various ceramic materials or bright metal. The ceramic material preferably is provided with a highly reflective surface. The reflector 30 supports the ceramic heater support 32 which may include arms provided with notches supporting the ribbon shaped resistance heater 34. This heater may be formed of a suitable electrical resistance alloy such as nickel chromium or iron chromium aluminum. Although the ribbon shape is preferred, other configurations may be used if desired.

The one piece cover 36 extends continuously over the heater 34 and the reflector 30. The edges of the cover 36 and the reflector 32 are held together by the metal ring 38. The cover 36 may be made of quartz or a high silica glass such as Vycor made by the Corning Glass Works or a recrystallized glass ceramic such as Cer-Vit manufactured by the Owens Illinois Glass Company.

Each of the controls 26 controls a double pole switch 40 connecting with the supply conductors 42 and 44. One of the poles of the switch 40 connects the supply conductor 44 with one terminal of the ribbon electric resistance heater 34 while the other pole connects the supply conductor 42 to the bridge type full wave rectifying circuit 46. The bridge circuit 46 includes a silicon controlled rectifier 48 in the bridge conductor 50 and oppositely oriented diode rectifiers 52 and 54 in the upper legs 56 and 58 and the oppositely oriented diode rectifiers 60 and 62 in the lower legs 64 and 66. The rectifiers in the four legs insure full wave rectification and unidirectional current flow through the bridge conductor 50 and the silicon controlled rectifier 48.

Figure 3:
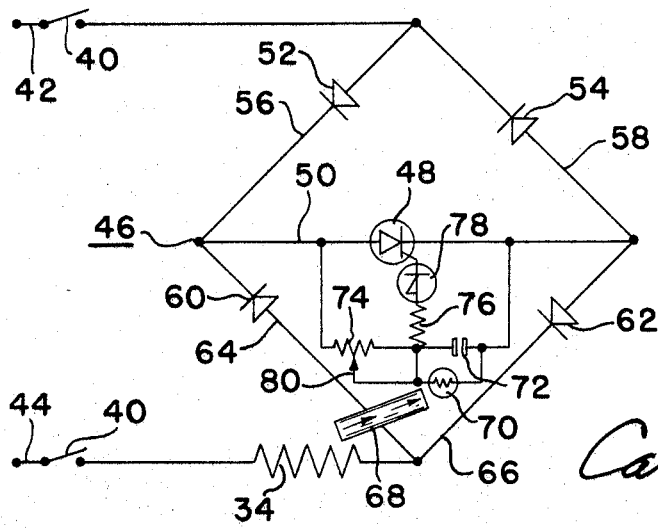

According to my invention, the silicon controlled rectifier 48 is controlled by a ray conductor 68 extending from within the enclosure provided by the reflector 30 and the cover 36 to the individual control unit 26 which contains the double pole switch 40 as well as the entire bridge controlling circuit 46 illustrated in FIGURE 3. This control unit 26 has within its housing a light dependent resistance 70 positioned at the end of the ray conductor 68 opposite the heater 22. The light dependent resistance 70 is connected in shunt with a capacitor 72 which has one terminal connected to the cathode of the silicon controlled rectifier and the other terminal connected through the variable resistance 74 to the anode of the silicon controlled rectifier. The conductor between the capacitor 72 and the variable resistance 74 connects through a current limiting resistance 76 and a four-layer diode 78 to the gate of the rectifier 48. The variable resistance 74 has an adjustable tap 80 which is adjusted by the control knob 82 of the individual control 26. The control knob 82 also opens and closes the double pole switch 40.

The resistance heater 34 emits heat energy rays with a wave length from between about .8 micron to 5 or 6 microns. Quantitatively these rays peak at about 2 microns wave length. The temperature range is about 1750° C. to 1850° C. The glass 36 transmits about 80% of the rays between .6 micron to 3.4 microns wave length. The ray conductor 68 is preferably made out of quartz or higher silicon glass such as Vycor and Cer-Vit or it may be a fiber optic conductor which may be made of glass or flexible quartz fibers preferably in continuous strands.

These are capable also of transmitting about 80% of the rays between .6 micron and 3.8 microns. The intensity of the rays transmitted through the conductor 68 will increase with the temperature between the reflector 30 and the cover 36 which will increase with the temperature of a utensil placed on the cover 36. The increased intensity of the rays pass through the conductor 68 will be directed to the light dependent restrictor 70 and will reduce the resistance thereof. The reducing of the resistance 70 will reduce the voltage applied to the capacitor 72. This will reduce the voltage applied through the resistance 76 and the four layer diode 78 to the gate of the silicon controlled rectifier 48. The adjustment of the variable resistance 74 by the adjustment of its terminal 80 will likewise increase or reduce the voltage applied to the gate of the silicon controlled rectifier in accordance with the temperature it is desired to maintain in the utensil placed on the cover 36.

As a result, when the temperature of the utensil approaches the temperature selected by the movable tap 80, the voltage applied to the gate of the silicon controlled rectifier 48 will be reduced, either by the reducing period of current flow each cycle or by discontinuing current flow periodically for a number of cycles. This arrangement therefore provides an excellent system for controlling the cover type of surface heaters. The ray conductor provides a simple method of transmitting the heat rays of varying intensity to the controlling light sensitive resistance which through the electronic control, controls the surface heater to reduce the energization thereof sufficiently to prevent the temperature selected for the utensil from being exceeded.

While the embodiments of the present invention as herein disclosed constitute preferred forms, it is to be understood that other forms might be adopted.

What is claimed is as follows:

1. A cooking range having a range top with a surface heater provided with heating means capable of emitting heat rays preponderantly between .7 and about 5 microns in wave length, a control means for said heating means comprising sensitive means responsive to rays between .7 and about 5 microns in wave length, said control means being located remote from said heating means, wherein the improvement comprises a ray conductor means capable of conducting rays between .7 and about 4 microns in wave length extending beneath said range top from said heating means to said sensitive means responsive to rays.

2. A cooking range as defined in claim 1 in which the heating means includes a surface heater provided with an enclosure comprising a cover over the surface heater and a reflector beneath said surface heater, said cover being permeable to rays between .7 and about 4 microns, said ray conductor means extending into said enclosure and having an end exposed to said surface heater.

3. A cooking range as defined in claim 1 in which the heating means comprises a surface heater provided with an enclosure with a cover over the surface heater and a reflector beneath the surface heater, said cover being permeable to rays between .7 and 4 microns, said ray conductor means being in the form of a glass rod extending from said control means beneath said range top into said enclosure and having an end exposed to said surface heater.

4. A cooking range as defined in claim 1 in which the heating means comprises a surface heater provided with an enclosure with a cover over the surface heater and a reflector beneath the surface heater, said cover being permeable to rays between .7 and about 4 microns, said ray conductor means being in the form of fiber optics extending from said control means beneath said range top into said enclosure and having an end exposed to said surface heater.

5. A cooking range as defined in claim 1 in which the sensitive means is located at the rear of the range top and comprises a light dependent resistance.

References Cited
UNITED STATES PATENTS

| | | | |
|---|---|---|---|
| 2,438,160 | 3/1948 | Green | 219—502 |
| 3,120,108 | 2/1964 | Pansing | 219—502 |
| 3,346,720 | 10/1967 | Siegla | 219—443 |

BERNARD A. GILHEANY, *Primary Examiner.*

FRED E. BELL, *Assistant Examiner.*

U.S. Cl. X.R.

219—451